(12) United States Patent
Lou et al.

(10) Patent No.: US 7,047,344 B2
(45) Date of Patent: May 16, 2006

(54) RESOURCE SHARING APPARATUS

(75) Inventors: Tzyy-Jenq Lou, Sijhih (TW); Sun-Chung Chen, Sijhih (TW)

(73) Assignee: Aten Inc., Sijhih (TW)

( * ) Notice: Subject to any disclaimer, the term of this patent is extended or adjusted under 35 U.S.C. 154(b) by 352 days.

(21) Appl. No.: 10/761,775

(22) Filed: Jan. 21, 2004

(65) Prior Publication Data
US 2004/0186943 A1   Sep. 23, 2004

(30) Foreign Application Priority Data
Mar. 18, 2003   (TW) ............................. 92105947 A

(51) Int. Cl.
G06F 13/14   (2006.01)
G06F 13/38   (2006.01)

(52) U.S. Cl. ...................... 710/305; 710/100
(58) Field of Classification Search ................ 710/305, 710/316, 62, 100
See application file for complete search history.

(56) References Cited

U.S. PATENT DOCUMENTS

| | | | | |
|---|---|---|---|---|
| 5,280,585 A | * | 1/1994 | Kochis et al. ................ | 710/48 |
| 5,638,521 A | * | 6/1997 | Buchala et al. ............. | 710/316 |
| 5,961,624 A | * | 10/1999 | Takayama ..................... | 710/314 |
| 6,073,188 A | * | 6/2000 | Fleming ....................... | 710/38 |
| 6,141,719 A | * | 10/2000 | Rafferty et al. ............. | 710/316 |
| 6,308,239 B1 | * | 10/2001 | Osakada et al. ............ | 710/316 |
| 6,532,512 B1 | * | 3/2003 | Torii et al. ................... | 710/316 |
| 6,546,450 B1 | * | 4/2003 | Liu ............................ | 710/316 |
| 6,915,367 B1 | * | 7/2005 | Gary et al. ................. | 710/244 |
| 6,934,793 B1 | * | 8/2005 | Ying et al. .................. | 710/316 |

* cited by examiner

Primary Examiner—Rehana Perveen
Assistant Examiner—Trisha Vu
(74) Attorney, Agent, or Firm—Thomas, Kayden, Horstemeyer & Risley

(57) ABSTRACT

A resource sharing apparatus includes an application specific integrated circuit and a central processing unit. The application specific integrated circuit includes a number of hubs, a number of device controllers for stimulating the peripheral apparatus, a bus, a host controller, and a root hub. Each of the hubs and the root hub has a host port and a number of peripheral ports. The host port of each hub is coupled to one personal computer, and the peripheral ports of each hub are coupled to one device controller and the peripheral apparatus. Some peripheral apparatus are coupled to the peripheral ports of the root hub, and the host port of the root hub is coupled to the host controller. The device controllers, the host controller, and the central processing unit, coupled to each other via the bus, control the operation of the resource sharing apparatus.

10 Claims, 1 Drawing Sheet

RESOURCE SHARING APPARATUS

This application claims the benefit of Taiwan application Serial No. 92105947, filed Mar. 18, 2003.

BACKGROUND OF THE INVENTION

1. Field of the Invention

The invention relates in general to a resource sharing apparatus, and more particularly to a non-internet-structure resource sharing apparatus.

2. Description of the Related Art

Due to development of computer technologies in recent years, office computerization becomes very popular. By way of internet communication, computers can not only contact with those all over the world, but also share interior peripherals, such as printers or scanners with others in the office, thereby improving the efficiency of resource usage.

In spite of popularized internet applications, for users in a small-scale office or family, it seems uneconomic and even unnecessary to set up internet networks for resource sharing purpose. Therefore, in order that a limited number of personal computers can effectively share resources with each other, developing another kind of resource sharing system, which can reduce operating complication, is necessary in place of the conventional internet sharing structure.

SUMMARY OF THE INVENTION

It is therefore an object of the invention to provide a resource sharing apparatus, in which interfaces that support hot plug are used to accomplish the purpose of sharing resources.

The invention achieves the above-identified objects by providing a resource sharing apparatus. The resource sharing apparatus enables peripheral apparatus to be shared by a number of personal computers by using a non-internet structure. The resource sharing apparatus includes an application specific integrated circuit (ASIC) and a number of personal computers. The ASIC includes a number of hubs, a number of device controllers, a bus, a host controller, and a root hub. The device controllers are used to stimulate peripheral apparatus, and the host controller can be used to stimulate the related USB keyboard and USB mouse functions of the operation system (OS) and the basis input/output system (BIOS) in each personal computer. Each of the hubs and the root hub is equipped with a host port and a number of peripheral ports. The host port of each hub is coupled to one personal computer, and the peripheral ports of each hub are coupled to one device controller and the peripheral apparatus.

On the other hand, the peripheral ports of the root hub are coupled to some peripheral apparatus, and the host port of the root hub is coupled to the host controller. The device controllers, the host controller, and the central processing unit are coupled to each other and transmit commands or datum via the bus so as to control the operation of the resource sharing apparatus.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
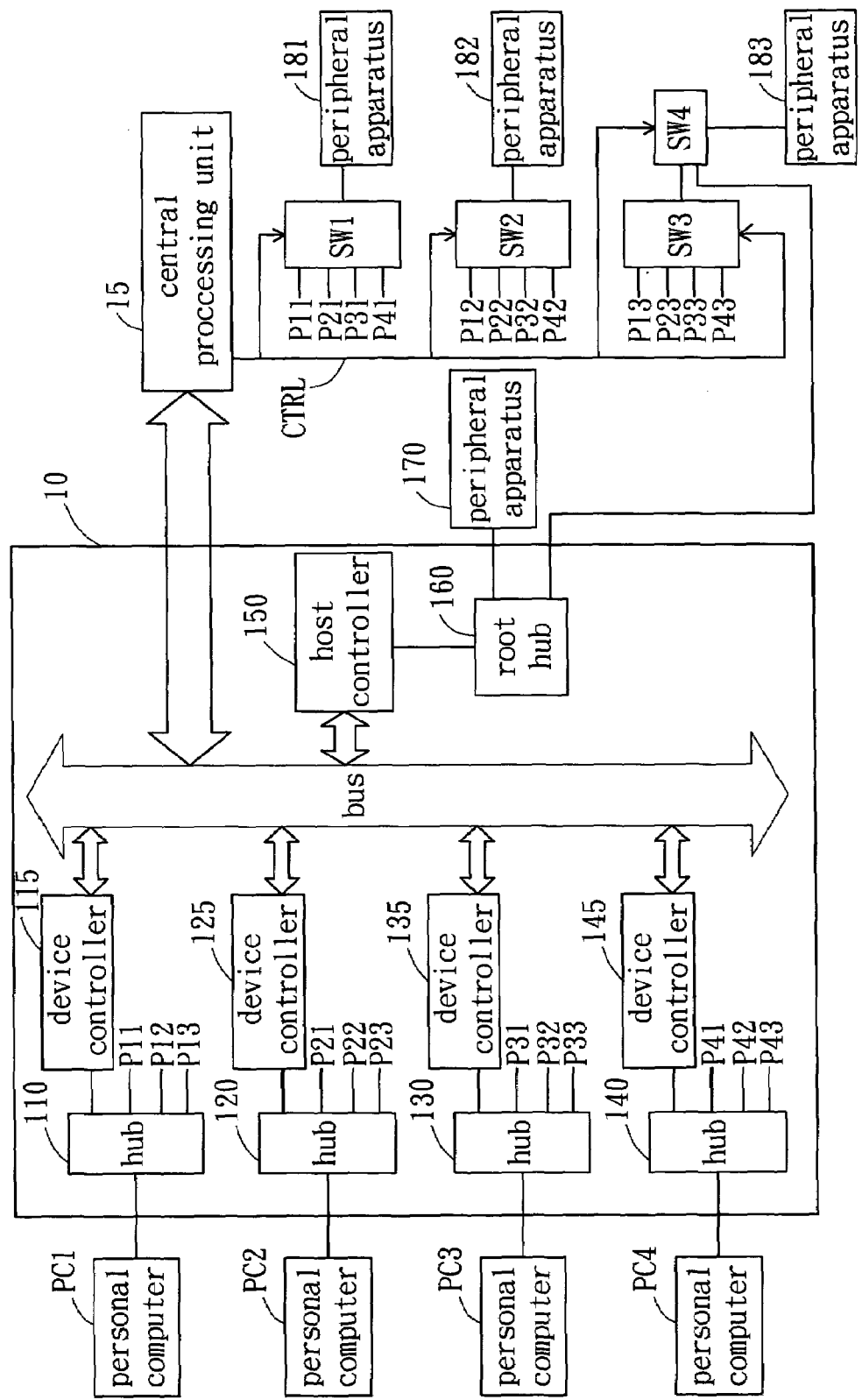
FIG. 1 is a block diagram of the resource sharing apparatus according to a preferred embodiment of the invention.

The resource sharing apparatus in the invention provides the function that a number of personal computers can share one or more peripheral apparatus in non-internet circumstances. Referring to FIG. 1, a block diagram of the resource sharing apparatus according to a preferred embodiment of the invention is shown. By using the resource sharing apparatus, peripheral apparatus 170, 181, 182, and 183 can be shared by personal computers PC1, PC2, PC3, and PC4. The resource sharing apparatus substantially includes an ASIC 10 and a central processing unit (CPU) 15. The ASIC 10 includes hubs 110, 120, 130, and 140, device controllers 115, 125, 135, and 145, a host controller 150, and a root hub 160. The device controllers 115, 125, 135, and 145 are respectively used to stimulate the OSs or the BIOSs of the personal computers PC1, PC2, PC3, and PC4. Moreover, the device controllers 115, 125, 135, and 145, the host controller 150, and the CPU 15 are coupled to each other via the bus 100 to transmit commands and datum.

The ASIC 10 includes a number of hubs, such as hubs 110, 120, 130, and 140, and each of them has one host port (B port) and four peripheral ports (A port). These host ports are respectively coupled to the personal computers PC1, PC2, PC3, and PC4, and the four peripheral ports of each hub 110, 120, 130, or 140 are respectively coupled to the peripheral apparatus 170, 181, 182, and 183. Especially, the peripheral apparatus 170 is coupled to the hubs 110, 120, 130, and 140 indirectly via stimulation of the device controllers 115, 125, 135, and 145. In addition, the peripheral ports of the hub 110 are respectively coupled to the switches SW1, SW2, and SW3, which are controlled by signals CTRL from the CPU 15, via the connecting lines P11, P12, and P13. Therefore, the peripheral apparatus 181, 182, and 183 can be selectively connected or disconnected to the personal computer PC1 by controlling these switches SW1, SW2, and SW3. The peripheral apparatus 181, 182, and 183 can be also selectively connected or disconnected to the personal computer PC2, PC3, or PC4 in the same way. The hubs 110, 120, 130, and 140, the device controllers 115, 125, 135, and 145, the host controller 150, and the root hub 160 are not devices of internet interface specifications, but those having interfaces that support hot hug, such as a universal serial bus (USB).

In the following illustration, well-known peripheral apparatus are taken for an example in the preferred embodiment of the invention. For example, the peripheral apparatus 170 is a USB keyboard, and the peripheral apparatus 183 is a USB mouse. The keyboard is coupled to the host controller 150 via the root hub 160, and the mouse is coupled to the root hub 160 or the switch SW3 via the switch SW4. The mouse can be coupled to one of the personal computers PC1, PC2, PC3, and PC4 via the switch SW3. The device controllers 115, 125, 135, and 145 are designed especially to stimulate the keyboard so that the stimulation effect can be complete. That differs from the conventional device controllers, which can stimulate only generic functions of the keyboard and the mouse, but not all their functions, such as hot keys or multi-media keys, due to their simultaneous stimulation of the keyboard and the mouse. The device controllers in the invention are used for stimulating the keyboard only, and each of them is coupled to one peripheral port of the corresponding hub while the mouse is coupled to another peripheral port of each hub in bypass way. Therefore, the keyboard and the mouse are respectively coupled to two different peripheral ports of each hub, which are independent, so that the effect that the device controllers stimulate the keyboard can be complete.

On the other hand, the mouse can be coupled to the root hub 160, which is controlled by the host controller 150, via the switch SW4. In applications, hot keys on the keyboard can be used to switch the mouse coupling states, such as coupling to the personal computer in bypass way by on screen display (OSD) operation, or coupling as an OSD-mode mouse. The peripheral apparatus 181, and 182, such as USB peripherals like a printer or a scanner, can be coupled to one of the personal computers PC2, PC3, and PC4 simultaneously by the switches SW1 and SW2. Except that device controllers have advantages of stimulating the peripheral apparatus completely, the circuit structure of the invention can upgrade the conventional keyboard-video-mouse (KVM) system to the keyboard-video-mouse-peripheral (KVMP) system. Therefore, not only the keyboard, the screen, and the mouse but also the peripheral apparatus can be shared by a number of personal computers, thereby effectively improving the flexibility of apparatus applications.

In such a circuit structure, for the host controller 150 is used to stimulate the related USB keyboard and the USB mouse functions of the OS and the BIOS, operation modes of the device controllers 115, 125, 135, and 145 can be controlled by firmware, such as a full speed (12 Mbps) operation or a low speed (1.5 Mbps) operation, which can be applied to SUN, Window, and Macintosh operation systems, thereby providing a widespread applications.

In addition to the above-mentioned KVMP function, the resource sharing apparatus of the invention has auto-switch function, which eases the sharing of the peripheral apparatus. For example, the peripheral apparatus 170 is a USB printer to be shared, and the device controllers 115, 125, 135, and 145 are used to stimulate the printer. The host controller 150, controlling the OS stimulation of the personal computer, stimulates the printer diver, and gives commands of USB specifications to the device controllers 115, 125, 135, and 145. As printing operations on the personal computer PC1, PC2, PC3, or PC4 have to be performed, the resource sharing apparatus can automatically couple the printer to that personal computer to take the printing jobs. As the printer is in busy state, the system can automatically switch the printer to do printing jobs on each personal computer one after another. The peripheral apparatus 181, and 182 are switched to couple to one of the personal computers by hand or hot-key commands, and by controlling the switches SW1 and SW2. However, the peripheral apparatus 170 can be automatically switched to each personal computer, which is different from the former two peripheral apparatus.

The resource sharing apparatus disclosed in the above-mentioned embodiment of the invention at least has the following advantages:

1. Due to the divided stimulations of the keyboard and the mouse, the stimulation effect can be complete.

2. Due to promoted application from the KVM system to the KVMP system, the application flexibility can be improved.

3. Due to the ASIC structure of the resource sharing apparatus, the integration can be increased, the cost can be reduced, and thus the production competition can be enhanced.

4. Owing that the operating velocity of the device controllers can be adjusted by firmware, the resource sharing apparatus can be applied to different operation systems.

5. Due to the auto-switch function, the convenience of sharing resources can be enhanced.

6. Due to the non-internet structure, such as a USB structure, the construction cost of the whole system can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A resource sharing apparatus, for enabling at least one peripheral apparatus to be shared by a plurality of personal computers, the resource sharing apparatus comprising:
   an application specific integrated circuit (ASIC), comprising:
      a plurality of hubs, each of the hubs having a host port (B port), and a plurality of peripheral ports (A port), wherein the hubs are one-to-one coupled to the personal computers via the host ports;
      a plurality of device controllers, coupled to the peripheral ports, wherein the device controllers are one-to-one coupled to the hubs for stimulating the peripheral apparatus;
      a bus, coupled to the device controllers;
      a host controller, coupled to the bus, for stimulating peripheral apparatus related functions of an operation system (OS) or a basis input/output operation system (BIOS) in the personal computers, and communicating with the device controllers via the bus;
      a root hub, comprising a host port and a plurality of peripheral ports, wherein the host port of the root hub is coupled to the host controller, and the peripheral apparatus is coupled to one of the peripheral ports of the root hub; and
   a central processing unit, coupled to the bus for controlling the operation of the ASIC.

2. The resource sharing apparatus according to claim 1, wherein the hubs, the device controllers, and the host controller have interfaces of universal serial bus specifications.

3. The resource sharing apparatus according to claim 2, wherein the peripheral apparatus comprises a printer.

4. The resource sharing apparatus according to claim 2, wherein the peripheral apparatus comprises a keyboard.

5. The resource sharing apparatus according to claim 2, wherein the peripheral apparatus comprises a mouse.

6. The resource sharing apparatus according to claim 1, wherein the resource sharing apparatus is used for enabling a first peripheral apparatus and a second peripheral apparatus to be shared by a plurality of personal computers, the first peripheral apparatus is coupled to one of the peripheral ports of the root hub, and the resource sharing apparatus comprises:
   a first switch, coupled to one of the peripheral ports of each hub; and
   a second switch, coupled to the first switch, the root hub, and the second peripheral apparatus, wherein the second peripheral apparatus is coupled to the root hub or one of the hubs by the first switch and the second switch according to a controlling signal from the central processing unit.

7. The resource sharing apparatus according to claim 6, wherein the hubs, the device controllers, and the host controller have interfaces of universal serial bus specifications.

8. The resource sharing apparatus according to claim 7, wherein the first peripheral apparatus is a keyboard, and the second peripheral apparatus is a mouse.

9. The resource sharing apparatus according to claim 1, wherein the resource sharing apparatus is used for enabling a first peripheral apparatus and a second peripheral apparatus to be shared by a plurality of personal computers, the first peripheral apparatus is coupled to one of the peripheral ports of the root hub, and the resource sharing apparatus comprises:

a switch, coupled to the second peripheral apparatus and one of the peripheral ports of each hub, wherein the second peripheral apparatus is coupled to one of the hubs by the switch according to a controlling signal from the central processing unit.

10. The resource sharing apparatus according to claim 9, wherein the hubs, the device controllers, and the host controller have interfaces of universal serial bus specifications.

* * * * *